UNITED STATES PATENT OFFICE.

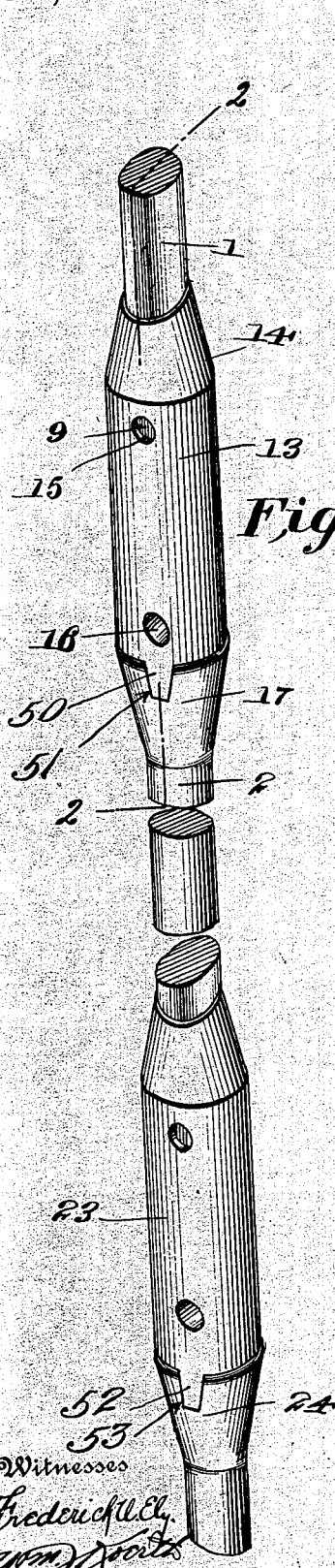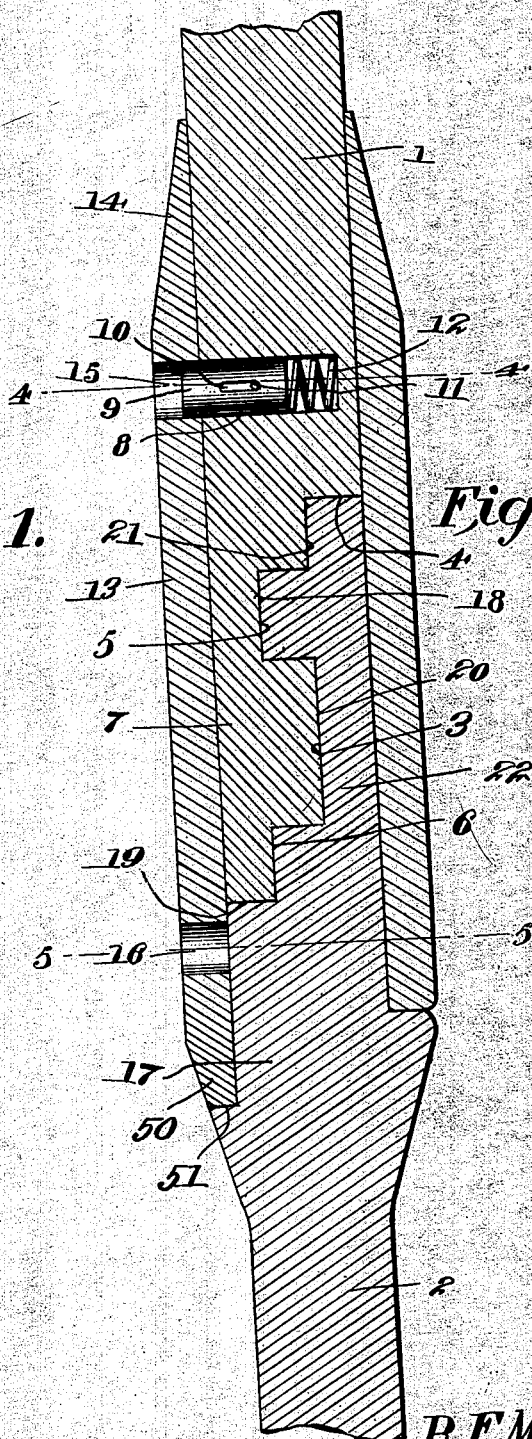

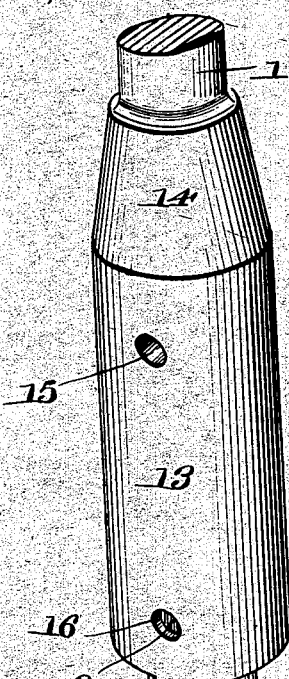
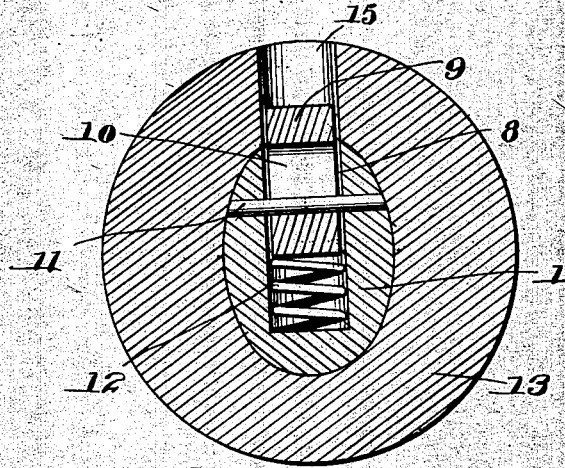
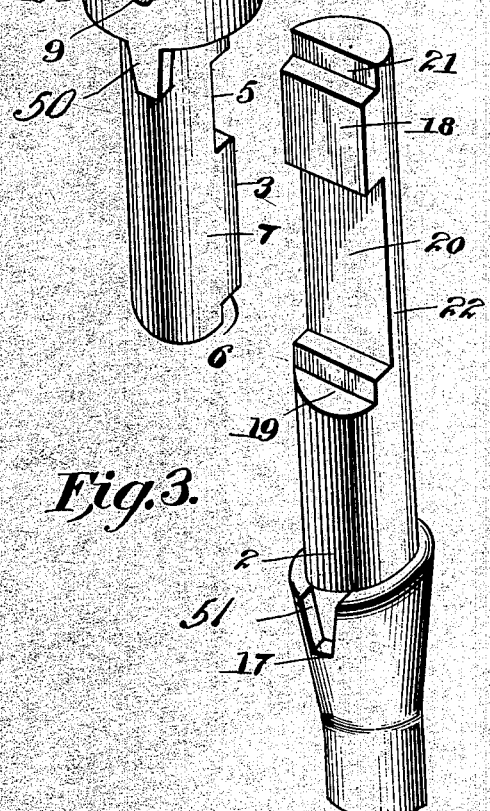
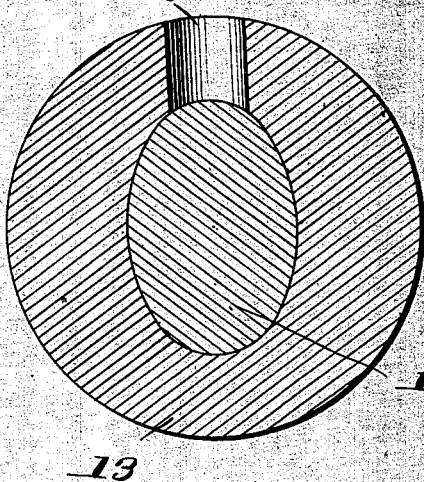

RICHARD F. McDONOGH, OF COALINGA, CALIFORNIA.

JOINT.

1,180,166.  Specification of Letters Patent.  Patented Apr. 18, 1916.

Application filed July 29, 1914. Serial No. 853,931.

*To all whom it may concern:*

Be it known that I, RICHARD F. MC-DONOGH, a citizen of the United States, residing at Coalinga, in the county of Fresno and State of California, have invented new and useful Improvements in Joints, of which the following is a specification.

The present invention relates to an improvement in means for securely connecting the ends of two members, such as rods which are employed for various purposes, the primary object of the same being to provide the ends of two rod sections with interengaging members, and to arrange upon one of the said sections a slidable sleeve which will entirely cover and prevent the disengagement of the interengaging portions of the rods, and also to provide means for automatically locking the sleeve when the same is drawn over the joint of the rods, or when the same is moved to uncover the joint to permit of the separation of the sections, and further whereby the sleeve cannot become accidentally removed from the rod section upon which it is arranged.

The embodiment of the invention set forth in this application is at present considered most desirable; but the right is reserved to make such changes from the construction shown and described as the scope of the appended claims will permit.

In the drawings: Figure 1 is a perspective view showing two rod sections connected in accordance with the present invention, Fig. 2 is a detail enlarged longitudinal sectional view on the line 2—2 of Fig. 1, Fig. 3 is a perspective view showing two of the rods disengaged, the sleeve being moved to permit of the members of the rod ends being connected, and Fig. 4 is a transverse sectional view on the line 4—4 of Fig. 2, Fig. 5 is a transverse sectional view approximately on the line 5—5 of Fig. 2.

My improved joint may be employed upon polished rods, sucker rods for oil or water wells, brace rods, connecting rods, and in other connections wherein it is desirable to securely connect two members and permit of the separation of the members when desired.

In the drawings, like characters of reference designate corresponding parts throughout the several views, and in which 1 denotes a rod rection and 2 a second rod section which is adapted to be connected with the section 1. The rods 1 and 2 each have their ends of a similar construction. Both of the rods have their ends preferably elliptical in cross section, while the central portions of the rods may be rounded in cross section if desired. The end of the rod 1 from one of its sides is cut centrally to provide a smooth face 3 which terminates in a right angular shoulder 4. The central straight wall 3, at a suitable distance from the shoulder 4, is provided with a transverse opening 5, and the outer corner of the said wall 3 is notched, as at 6. The portion of the wall 3 between the notch 6 and the slot or opening 5 provides what I will term a tongue, and which is designated by the numeral 7. Of course, it will be understood that the tongue 7 is formed upon each end of the rod section.

The rod, at a suitable distance inwardly of its shoulder 4, at one of its ends, and upon its face opposite that provided with the tongue 7, is formed with a depression 8 within which is seated a bolt 9. The bolt is provided with an elongated slot 10 through which passes a pin 11 that is inserted transversely through the rod section 1, while arranged in the slot 8 exerting a tension between the end wall thereof and the end of the bolt 9 to project the said bolt partially through the depression 8 is a spring 12. Arranged for slidable movement upon this end of the rod 1 is a sleeve 13 that preferably has one of its ends coneshaped as indicated by the numeral 14. The sleeve is provided, at two points, one adjacent each of its ends, with a round opening, the said openings being indicated by the numerals 15 and 16 respectively. The bolt 9 is preferably round in cross section, and is adapted to engage within the opening 16 when the sleeve is in the position illustrated in Fig. 3 of the drawings, the said bolt engaging in the opening 15 when the sleeve is forced over the tongue 3 to retain the second section 2 connected with the section 1, in a manner which will presently be described.

The ends of the rod section 2 are cut longitudinally and transversely to provide the same each with a straight inner face 18, and a shoulder 19 which is arranged at a right angle to the face. The face 18 is provided with a transverse slot 20, the distance between the end walls of which being equal to the distance between the end walls of the tongue 7, while the extreme end of the face or wall 18 is notched, as at 21, the notched portion agreeing in length with the portion of the wall 3 between the shoulder 4 and the transverse wall of the slot 5 which is arranged adjacent the said shoulder. The opposite portion of the wall 18, or that adjacent its shoulder 19, and what I will term the inner wall of the slot 20 is shaped to agree with the notch 6 in the end of the rod section 1. The slot 20 and its tongue provided between the said slot and the notched portion 21 at one end of the rod section 2 is arranged toward the opposite side or face of the rod, and the tongue 7 provided upon the wall 3 and the tongue 22 provided between the slot 20 and the notch 21 preferably vary in length, the tongue 18 received within the slot 5 at the end of the rod 1 provided with the sleeve being of a less length than the tongue 7 which engages within the slot 20 of the section 2, the tongues of each of the members, however, fully securing the slots in the said members, so that when the rods are connected, the same will be retained against longitudinal movement.

The rod 2 is provided upon one of its ends with a sleeve 23, similar to the sleeve 13, the said rod being also provided with spring pressed bolts which engage within one of two spaced openings in the said sleeve 23, while the opposite end of the rod at a suitable distance from its shoulder 19 is formed with a cone-shaped enlargement 17, similar to the cone-shaped end 14 of the sleeve 13 which is slidably mounted upon the rod 1. When the ends of the rods are brought together and their tongues are arranged within respective grooves, an instrument is employed, such as a punch which is inserted within the opening 16 to force the bolt member 9 within the depression 8 to permit of the sleeve being drawn over the joint at the rod ends until the same contacts with the cone-shaped shoulder. When the sleeve has been brought to this position, the opening 15 will have been brought directly over the bolt 9, the spring 12 exerting a pressure upon the said bolt forces the same into the said opening 15, thus securely locking the sleeve upon the rods and effectively connecting the rods against independent movement in any direction. To disconnect the rods, it is merely necessary to again insert an instrument within the opening 15 to force the bolt within its depression 8, and slide the sleeve in a reverse direction, to uncover the joint. Either of the rod sections may be positioned to provide the top portion when the device is used as a polish rod, sucker rod or the like, but I have found it preferable to arrange the rods so that the sleeves of the upper sections will be disposed to contact with the cone-shaped enlargements upon the opposite sections. It is to be understood that the interlocking engagement of the tongues and grooves at the ends of the rod sections will entirely relieve the bolt 9 from any strain which might otherwise be inflicted thereon, the sleeve primarily serving as means for preventing the rotation of the rods at their ends from separation, but as a matter of fact the sleeve reinforces the rod at the joint to sustain the same against transverse torsional strain and adds materially to the strength of the rod.

From the above description, taken in connection with the accompanying drawings, the simplicity of the device as well as the advantages thereof will, it is thought, be perfectly apparent to those skilled in the art to which such invention appertains without further detailed description.

The sleeve 13, at the end thereof which rests upon the shoulder provided by the cone-shaped enlargement 17 of the rod section 2, is formed preferably with a V-shaped lug 50 which is adapted to be received within the V-shaped depression 51 provided in the said enlargement 17. Likewise the sleeve 23 is provided with a similar lug 52 which is received within a depression 53 provided in the cone-shaped enlargement 24. Such an arrangement relieves the bolts 9 from strain when the rod is rotated, and likewise insures the proper positioning of the bolts with relation to the openings in the sleeve, when the said sleeve is moved to cover the joints of the rod sections.

Having thus described the invention, what I claim is:

1. The herein described means for connecting the meeting ends of rods including two rods having their ends cut approximately central and longitudinally to provide flat engaging faces, the said engaging faces being provided with spaced projections and intervening spaces between the projections which are adapted to be brought into co-engagement, a slidable sleeve upon one of the rods, means for sustaining the sleeve upon the said rod out of engagement with the other rod, said sleeve adapted to be moved upon the said rod to engage with the other rod, means for locking the sleeve upon the said other rod, and said sleeve being formed with an extending tongue adapted to be received in a recess in one of the rods.

2. The herein described means for connecting the ends of two rods including rods having their ends of a substantially elliptical formation and being cut centrally and longitudinally for a portion of their lengths and their said ends to provide straight abutting faces, said straight faces being formed with substantially rectangular extensions and depressions between the said depressions forming lugs and grooves receiving the lugs, one of said rods having a laterally extending spring pressed dog, a sleeve having openings to receive the dog, said sleeve adapted to be slidably arranged upon the rod to envelop the second rod and one of said openings being arranged to lock the sleeve in its enveloping position, as and for the purpose set forth.

3. The herein described means for connecting the meeting ends of rods, including rods having their ends substantially elliptical in cross section and cut longitudinally to provide straight flat contacting faces, the said straight faces being provided with substantially rectangular projections and intervening spaces between the projections whereby the projections upon one of the rods may be received in the space between the projections in the other rod, one of said rods, at the terminal of its elliptical portion being thickened to provide a shoulder and the said shoulder being formed with a longitudinally arranged depression, a slidable sleeve upon the other rod having a tongue adapted to be received in the depression when the sleeve is moved longitudinally of the rod upon which it is arranged to envelop the end of the other rod, a laterally movable bolt carried by the rod upon which the sleeve is mounted, and the said sleeve being formed with openings adapted to receive the bolt to sustain the sleeve in locking position upon the rod ends or when the same is moved to permit of the disassociation of the said rod ends.

In testimony whereof I affix my signature in presence of two witnesses.

RICHARD F. McDONOGH.

Witnesses:
T. J. NAMAHAN,
J. L. LENNAN.